(12) United States Patent
Yamada

(10) Patent No.: US 6,766,101 B1
(45) Date of Patent: Jul. 20, 2004

(54) OPTICAL DISC PLAYBACK APPARATUS

(75) Inventor: Jiro Yamada, Kyoto (JP)

(73) Assignee: Matsushita Electric Industrial Co., Ltd. (JP)

( * ) Notice: Subject to any disclaimer, the term of this patent is extended or adjusted under 35 U.S.C. 154(b) by 978 days.

(21) Appl. No.: 09/592,276

(22) Filed: Jun. 12, 2000

(30) Foreign Application Priority Data

Jun. 10, 1999 (JP) .......................................... 11-163274

(51) Int. Cl.[7] .......................... H04N 5/91; H04N 5/781
(52) U.S. Cl. .......................... 386/68; 386/126; 386/95
(58) Field of Search ............................. 386/46, 68, 69, 386/95, 125, 126

(56) References Cited

U.S. PATENT DOCUMENTS

| | | | | |
|---|---|---|---|---|
| 5,915,067 A | * | 6/1999 | Nonomura et al. | 386/70 |
| 6,396,997 B2 | * | 5/2002 | Moriyama et al. | 386/46 |
| 6,415,098 B1 | * | 7/2002 | Taira | 386/70 |

FOREIGN PATENT DOCUMENTS

| | | |
|---|---|---|
| EP | 0 737 008 A2 | 10/1996 |
| EP | 0 737 009 A2 | 10/1996 |
| EP | 0 737 980 A2 | 10/1996 |
| EP | 0 797 200 A2 | 9/1997 |
| EP | 0 856 849 A2 | 8/1998 |
| JP | 05 089646 A | 4/1993 |

* cited by examiner

Primary Examiner—Huy Nguyen
(74) Attorney, Agent, or Firm—Parkhurst & Wendel, L.L.P.

(57) ABSTRACT

The present invention provides an optical disc playback apparatus which realizes the scan search in which the scan search time for performing the scan search of plural programs having different playback data transfer bit rates is proportional to the real playback time of each program. In the scan search for playing back necessary data among audio/video data from an optical disc 20 which is rotated by a spindle motor 1 using an optical pickup 2, a system control unit 17 reads title set management information from a title set management information storage unit 13, and obtains last position data, initial position data and the playback time of each program including the necessary data. The address amount of relative motion per one scan search operation in each program is decided on the basis of a value which is obtained by subtracting the initial position data of the program from the last position data, and dividing the subtraction result by the playback time of the program. These processes are applied similarly to each program.

5 Claims, 14 Drawing Sheets

Fig.12

| Main Item | | DVD-Audio Standard | DVD-Video Standard |
|---|---|---|---|
| Video Playback Stream | | MPEG1,MPEG2 | MPEG1,MPEG2 |
| Audio Playback Stream | Stream | 1.LinearPCM(mandatory)<br>2.PackedPCM(mandatory) Lossless compression<br>3.AC-3(option)compression<br>4.DTS(option)compression | 1.AC-3(mandatory)compression<br>2.LinearPCM(mandatory)<br>3.MPEG(mandatory)compression<br>4.DTS(option)compression<br>5.SDDS(option) |
| | Number of Channel Sampling Frequency Quantization | Max.6(in linear)corresponding to Smart Contents 48KHz/44.1KHz×1/2/4 Max.192KHz 16/20/24bits | Max.6(in compression) 48KHz×1/2 Max.96KHz 16/20/24bits |
| Still Picture Playback | | 1.Browsable<br>2.Random/shuffle<br>3.Sequential<br>4.Maximum number ASVU Unit 2Mbytes*99  About 100 frames(depending on image quality) | None |
| Text | | 1.Normal Text Data<br>2.Real TimeText | 1.Normal Text Data |
| Others | | 1.Hidden Track Playback<br>2.Spotlight Playback<br>3.Audio Selection<br>4.No Parental Control<br>5.No Region Code Control | 1.Muliti Angle<br>2.Muliti Caption<br>3.Muliti Voice<br>4.Parental Control<br>5.Region Code Control |
| Disc Management Information | | AMG | VMG |
| Management Target Title Set | | ATS+VTS | VTS |
| Navigation command | | • Commands defined by AMG and ATS are different from those of Video and peculiar to Audio<br>• Commands defined by VTS are ones having restriction on Video Standard | Commands defined by VMG and VTS are peculiar to Video |

Fig.13

L : Left
R : Right
Lf : Left front
Rf : Right front
C : Center
LFE : Low Frequency Effects
S : Sorround
Ls : Left Surround
Rs : Right Sorround

| No. | Ch0 | Ch1 | Ch2 | Ch3 | Ch4 | Ch5 | the number of Ch |
|---|---|---|---|---|---|---|---|
| 1 | C | | | | | | 1 |
| 2 | L | R | | | | | 2 |
| 3 | Lf | Rf | S | | | | 3 |
| 4 | Lf | Rf | Ls | Rs | | | 4 |
| 5 | Lf | Rf | LFE | | | | 3 |
| 6 | Lf | Rf | LFE | S | | | 4 |
| 7 | Lf | Rf | LFE | Ls | Rs | | 5 |
| 8 | Lf | Rf | C | S | | | 4 |
| 9 | Lf | Rf | C | Ls | Rs | | 5 |
| 10 | Lf | Rf | C | LFE | | | 4 |
| 11 | Lf | Rf | C | LFE | S | | 5 |
| 12 | Lf | Rf | C | LFE | Ls | Rs | 6 |
| 13 | Lf | Rf | C | S | | | 4 |
| 14 | Lf | Rf | C | Ls | Rs | | 5 |
| 15 | Lf | Rf | C | LFE | | | 4 |
| 16 | Lf | Rf | C | LFE | S | | 5 |
| 17 | Lf | Rf | C | LFE | Ls | Rs | 6 |
| 18 | Lf | Rf | Ls | Rs | LFE | | 5 |
| 19 | Lf | Rf | Ls | Rs | C | | 5 |
| 20 | Lf | Rf | Ls | Rs | C | LFE | 6 | channel group 1 : Ch0–Ch2    channel group 2 : Ch3–Ch5

Fig.14

|  | the number of bits Q | sampling frequency fs |
|---|---|---|
| channel group 1 | 16bit 20bit 24bit | 48KHz 96KHz 192KHz 44.1KHz 88.2KHz 176.4KHz |
| channel group 2 | 16bit 20bit 24bit | 48KHz 96KHz 44.1KHz 88.2KHz |

OPTICAL DISC PLAYBACK APPARATUS

FIELD OF THE INVENTION

The present invention relates to optical disc playback apparatus and, more particularly, to optical disc playback apparatus which realize a scan search operation having a rate proportional to a playback rate of an arbitrary playback unit program, when playback unit programs are respectively played back with an optical disc which has multimedia data including digital moving picture data and digital audio data recorded thereon and which disc has playback data transfer bit rates varying with the playback unit programs.

BACKGROUND OF THE INVENTION

In recent years, DVD (Digital Versatile Disc)-Videos which have greatly increased storage capacities are coming into wide use in place of conventional laser discs and video CDs, and many movies are put on the market. These DVD-Video standard discs are standardized attaching importance to playback of video without attaching importance to playback of various types of audio. Therefore, DVD-Video standard cannot realize playback in conditions of linear PCM, 192-KHz sampling frequency, 24 bit/sec, 2 channels, and more than 74 minutes, or playback in conditions of linear PCM, 96-KHz sampling frequency, 24 bit/sec, 6 channels, and more than 74 minutes.

Accordingly, DVD-Audio standard attaching importance to the playback of various types of audio is established as one of DVD standards. As shown in FIG. 9(*a*), the physical layer structure and file layer structure of DVD-Audio standard are the same as those of DVD-Video standard and only its application layer structure is different from that of DVD-Video standard. However, as shown in FIG. 9(*b*), DVD-Video standard and DVD-Audio standard have a common part in the application layer structure. FIG. 12 shows the comparison of contents between DVD-Video standard and DVD-Audio standard.

FIG. 10 shows a data structure of a file in the DVD-Audio standard disc having both of an Audio zone and a Video zone. The data structure according to DVD-Audio standard is divided broadly into a Volume zone and a File zone. Information of files in the File zone is recorded in the Volume zone. Video data files, audio data files, and files of data other than audio/video data (for example, computer data) are recorded in the File zone. The video data files, the audio data files, and the files of data other than audio/video data correspond to a DVD-Video zone, a DVD-Audio zone and a DVD-others zone, respectively.

In FIG. 10, four zones, i.e., a DVD-Volume zone 91, a DVD-Audio zone 92, a DVD-Video zone 93 and a DVD-Others zone 94 are defined. Among those, the DVD-Audio zone 92 comprises one piece of audio disc management information (i.e., Audio Manager, hereinafter referred to as "AMG") 95 and one or more Audio Title Sets (hereinafter referred to as "ATS") 96. The DVD Video zone 93 comprises one piece of video disc management information (i.e., Video Manager, hereinafter referred to as "VMG") 97 and one or more Video Title Sets (hereinafter referred to as "VTS") 98. That is, according to DVD-Audio standard, one disc can simultaneously include the DVD-Audio zone 92 and the DVD-Video zone 93. When a title in the DVD-Audio zone 92 is to be selected, the ATS 96 is selected and when a title in the DVD-Video zone 93 is to be selected, the VTS 98 is selected. Although the DVD-Video zone 93 includes the VMG 97, when the whole disc is to be managed as a DVD-Audio standard disc, it is managed using the AMG 95 instead of the VMG 97.

ATS Information includes object position information indicating the position of audio data on the optical disc, sequence information indicating the playback order of the audio data, and object playback information indicating playback information of the audio data, as Program Chain Information (hereinafter referred to as "PGCI"). When playback is performed, a program which is specified by the PGCI is played back.

The DVD-Audio standard disc enables to play back various audio signals as shown by a diagram showing combinations of audio signals of a DVD-Audio standard disc of FIG. 13, for each program. It is possible that the number of channels, the sampling frequency and the number of quantization bits are defined for each of channel groups 1 and 2, and then combined. According to this combination, the data transfer bit rates are decided so as not to exceed the maximum data transfer bit rate (9.6 Mbit/sec).

In addition, according to a diagram of FIG. 14 for selecting conditions for each channel group of the DVD-Audio standard disc, the number of bits Q and the sampling frequency fs can be independently selected for each channel group in a range which does not exceed the maximum transfer rate (9.6 Mbit/sec). The minimum data transfer bit rate is obtained in a case where the number of channels=1, the sampling frequency=44.1 KHz and the number of quantization bits=16. The data transfer bit rate in this case is about 0.7 Mbit/sec. On the other hand, the maximum data transfer bit rate is obtained in a case where the number of channels=2, the sampling frequency=192 KHz and the number of quantization bits=24. The data transfer bit rate in this case is about 9.2 Mbit/sec. Therefore, the ratio of the minimum data transfer bit rate to the maximum data transfer bit rate is about 13 times.

There is a scan search operation of moving an optical pickup by a predetermined amount of address in a jumping operation while repeating the playback operation and the jumping operation, to search an arbitrary playback point.

In the case of DVD-Video standard disc, since video signals have compressed formats (MPEG), signals recorded on the disc have variable data transfer bit rates. Therefore, the relationship of the playback data amount to the time required for playback (hereinafter, referred to as playback time) is not uniform. Accordingly, in performing the scan search, when the jumping is performed by the predetermined amount of address, the playback time for each jumping is not fixed. As a result, even when a user executes the scan search operation to search an arbitrary playback point, the playback times do not vary in proportion to the time required for the scan search (hereinafter referred to as scan search time). Therefore, it is very hard to use the DVD-Video standard disc. Accordingly, in the case of DVD-Video standard disc, information of scan search addresses which realize the linear changes in plural playback times of a program at addresses which are previous and subsequent to the present address required for the scan search is recorded on the disc together with video signals. When the scan search is performed, the jumping operation can be performed on the basis of the scan search address information.

In the case of DVD-Audio standard disc, an audio signal necessitates a linear PCM format. Since signals recorded on the disc in the linear PCM format are not in compressed formats, the signals do not have variable data transfer bit rates but have a fixed data transfer bit rate. Therefore, the relationship of the playback data amount to the playback time is uniform. Accordingly, in performing the scan search, when the optical pickup is jumped by the predetermined amounts of address, the playback time for each jumping has a fixed value. Therefore, the scan search address information is not recorded on the DVD-Audio standard disc together with the playback signals, although this information is recorded on the DVD-Video standard disc together with the playback signals.

In the case of DVD-Audio standard disc, while the signals recorded on the disc have a fixed data transfer bit rate, the combinations of the number of channels, the sampling frequency and the number of quantization bits for each of the channel groups 1 and 2 as shown in FIG. 13 can vary by the playback program units. Accordingly, the data transfer bit rates vary by the playback program units. Therefore, in performing the scan search, when the optical pickup is jumped by the predetermined amounts of address, the playback time for each jumping is not fixed in different playback program units. As a result, even when the user executes the scan search operation to search an arbitrary playback point, the playback time for one scan search is not fixed in different playback program units. Therefore, it is very hard to use the DVD-Audio standard disc.

In addition, the program information (hereinafter referred to as "ATS#PGI") includes a program content (hereinafter referred to as "ATS#PG#CNT") indicating audio spec information, and thereby the combination of the number of channels, the sampling frequency and the number of quantization bits for each of the channel groups 1 and 2 can be previously known for each playback program unit. However, it is very difficult to univocally calculate the data transfer bit using the audio spec information, because there are combinations of the channel groups 1 and 2.

FIG. 11 shows the relationship between the playback time and the playback data amount for each playback program unit of the DVD-Audio standard disc. In the case shown in FIG. 11, when the data transfer bit rates of PG#1 to PG#4 are all equal (in this case, audio signals of PG#1 to PG#4 are all at 88.2 KHz, 20 bit/sec, 2 channels), the relationship between the playback time and the playback data amount is uniform as shown by line "B". On the other hand, when the data transfer bit rates of PG#1 to PG#4 differ, the data transfer bit rate in each playback program unit is fixed, but the data transfer bit rate varies at each time when the different program unit is played, as shown by line "A".

SUMMARY OF THE INVENTION

It is an object of the present invention to provide an optical disc playback apparatus which realizes the scan search operation in which the scan search time is proportional to the playback time.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided an apparatus for playing back an optical disc comprising an audio/video data storage area containing plural pieces of audio or video data which have playback data transfer bit rates varying with playback unit programs; and a title set management information storage area and a disc management information storage area as program management information storage areas containing program management information including title set management information and disc management information for playing back the plural pieces of audio or video data in the audio/video data storage area, respectively, and in a scan search for playing back necessary data in the audio or video data, the optical disc playback apparatus obtains last position data, initial position data, and a playback time of a program having the necessary data from the program management information, and decides an address amount of relative motion per one scan search operation for the program by arithmetic using the last position data, the initial position data, and the playback time.

According to a 2nd aspect of the present invention, in the optical disc playback apparatus of the 1st aspect, the program management information is read and stored in storage means at a time when the optical disc is mounted.

According to a 3rd aspect of the present invention, in the optical disc playback apparatus of the 1st or 2nd aspect, a value is obtained by the arithmetic, by subtracting the initial position data of the program from the last position data, and then dividing the subtraction result by the playback time.

According to a 4th aspect of the present invention, in the optical disc playback apparatus of one of the 1st to 3rd aspect, the arithmetic is performed by providing a comparison table having values of address amounts of relative motion for combinations of the last position data, the initial position data and the playback time of the program, and searching a value from the comparison table.

According to a 5th aspect of the present invention, there is provided an apparatus for playing back an optical disc comprising an audio/video data storage area which contains plural pieces of audio or video data; at least one title set management information storage area which contains audio or video sequence information constituting an audio or video sequence and indicating a predetermined playback order of the audio or video data, object position information indicating a position of the audio or video data on the optical disc, and object playback information of the audio or video data; and at least one disc management information storage area which contains title set position information indicating a position of the title set management information storage area on the optical disc, and disc management information for managing the whole disc, and the optical disc playback apparatus comprises reading means for reading the audio or video data, the audio or video sequence information, the object position information, the object playback information, the title set position information, and the disc management information from the optical disc, to play back the information; control means for controlling the reading means; disc management information storage means containing the disc management information which is obtained from the at least one disc management information storage area; and title set management information storage means containing the title set management information which is obtained from the title set management information storage area, and in the optical disc playback apparatus, the control means perform control to read the audio or video sequence information, the object position information, the object playback information, the title set position information, and the disc management information from the optical disc, thereby to store the information in the title set management information storage means or the disc management information storage means; control the reading means on the basis of respective contents of the disc management information, the audio or video sequence information, the object position information, the object playback information, and the title set position information; when performing a scan search operation, previously calculate an amount of playback data per unit playback time on the basis of the object position information and a playback time of each program included in the object playback information, and an amount of playback data which is obtained from a last position and an initial position of each program; and decide an address amount of relative motion per one scan search operation on the basis of the calculation result.

Therefore, the decided address amount of relative motion is used for each of programs in a range to be scan-searched, whereby the scan search operation in which the scan search time is proportional to the playback time can be realized.

BRIEF DESCRIPTION OF THE DRAWINGS

FIG. 12 is a diagram for comparing contents of DVD-Video standard and DVD-Audio standard.

FIG. 13 is a diagram showing combinations of audio signals of the DVD-Audio standard disc.

FIG. 14 is a diagram for selecting conditions for each channel group of the DVD-Audio standard disc.

DETAILED DESCRIPTION OF THE PREFERRED EMBODIMENTS

Figure 1:
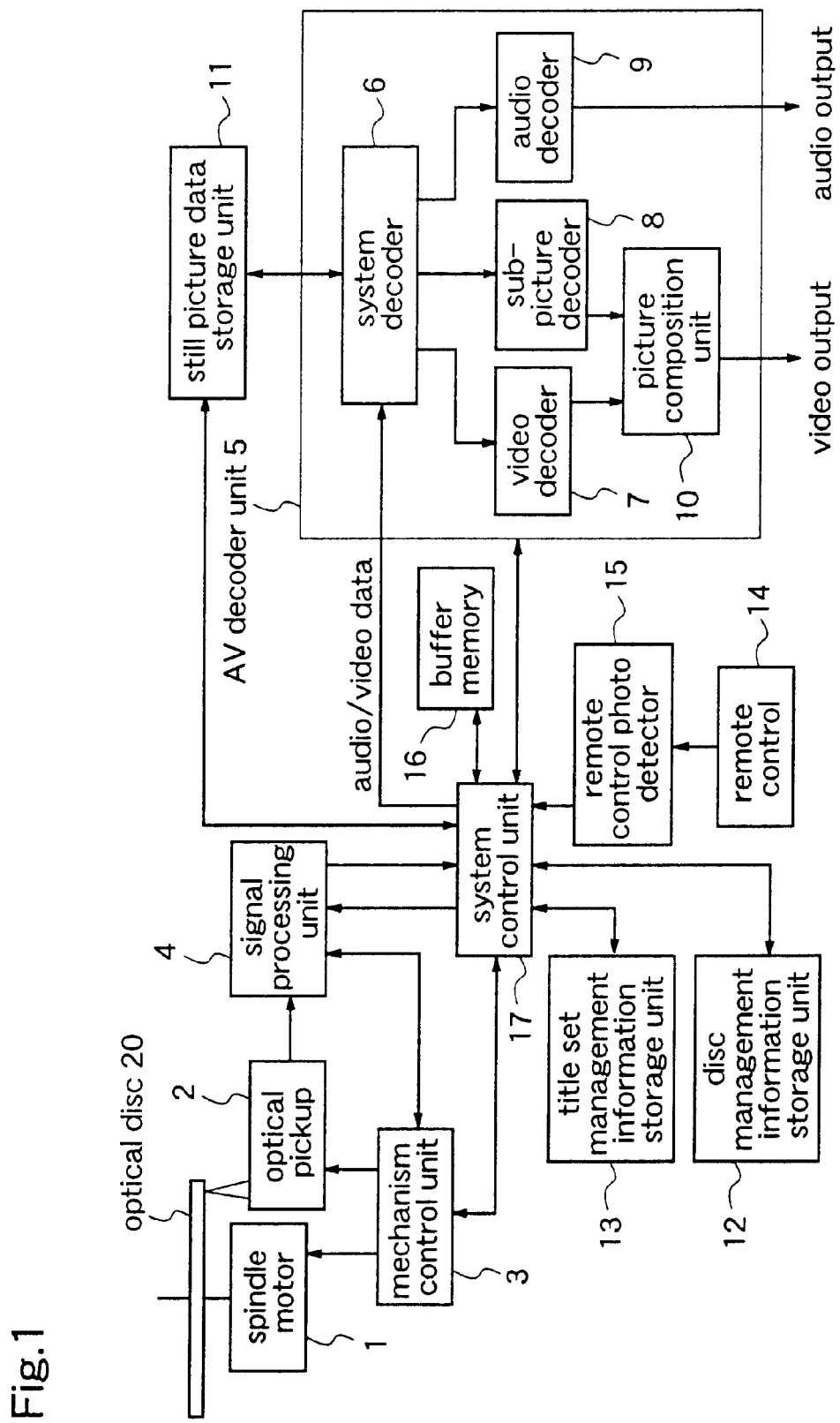
FIG. 1 is a block diagram illustrating a whole structure of an optical disc playback apparatus according to an embodiment of the present invention.

Hereinafter, an embodiment of the present invention will be described with reference to FIGS. 1 to 8. FIG. 1 is a block diagram illustrating a whole structure of an optical disc playback apparatus according to an embodiment of the present invention. In FIG. 1, a spindle motor 1 rotates an optical disc 20, and an optical pickup 2 reads signals which are recorded on the optical disc 20. A mechanism control unit 3 controls a mechanism system including the spindle motor 1 for driving the disc 20 and the optical pickup 2 for reading the signals which are recorded on the disc 20. To,be specific, the mechanism control unit 3 controls the speed of the spindle motor and simultaneously controls an actuator of the optical pickup 2 and moves a pickup position, according to track position information indicated by the system control unit 17. When a correct track is detected under servo control, the optical pickup 2 is subjected to rotational delay until it reaches a position where desired physical sectors are recorded, and reads signals continuously from the desired position.

A signal processing unit 4 subjects the signals which are read by the optical pickup 2 to signal processing such as amplification, waveform shaping, binarization, demodulation and error correction. The data which was subjected to the signal processing by the signal processing unit 4 are stored in a buffer memory 16 in logical block units. The system control unit 17 reads the data stored in the buffer memory 16, and when the read data are disc management information, it stores the data in a disc management information storage unit 12. When the data read from the buffer memory 16 are still picture data, the read data are stored in a still picture data storage unit 11. Similarly, when the data read from the buffer memory 16 are title set management information data, the system control unit 17 stores the title set management information including audio/video sequence information, object position information, object playback information and the like, in a title set management information storage unit 13, and transfers Title Sets, i.e., audio/video data to a system decoder 6. Here, the disc management information storage unit 12 contains title set position information indicating the position of the title set management information data on the disc.

An AV decoder unit 5 comprises a system decoder 6, a video decoder 7, a sub-picture decoder 8, an audio decoder 9 and a picture composition unit 10. The AV decoder unit 5 decodes the audio/video data which are obtained from the signal processing unit 4 via the system control unit 17 and the buffer memory 16, to convert the audio/video data which was subjected to the signal processing into original audio signals or video signals.

The system decoder 6 distinguishes among data on the basis of stream ID and substream ID information included in the audio/video data which are transferred from the buffer memory 16 in packet units, and outputs video data to the video decoder 7, sub-picture data to the sub-picture decoder 8, and audio data to the audio decoder 9, respectively. In addition, when the system control unit 17 inputs the still picture data from the still picture data storage unit 11 to the system decoder 6, the system decoder 6 outputs the still picture data to the video decoder 7 as video data.

The video decoder 7 decodes and decompresses the video data which are input by the system decoder 6, and outputs digital video signals to the picture composition unit 10.

When the sub-picture data which are input from the system decoder 6 are run-length-compressed image data, the sub-picture decoder 8 decodes and decompresses the sub-picture data, and outputs the decoded and decompressed data to the picture composition unit 10 in the same format as that of the video signal.

The audio decoder 9 decodes the audio data which are input by the system decoder 6, and outputs digital audio signals. These digital audio signals are converted into analog audio signals by a circuit (not shown), and thereafter input to an audio input of a display apparatus or an audio amplifier.

The picture composition unit 10 outputs video signals which are obtained by combining the output of the video decoder 7 and the output of the sub-picture decoder 8 at a ratio instructed by the system control unit 17. These video signals are converted into analog video signals by a circuit (not shown), and thereafter input to a video input of the display apparatus.

The still picture data storage unit 11 contains the still picture data which are recorded on the DVD-Audio standard disc, the disc management information storage unit 12 contains the disc management information, and the title set management information storage unit 13 contains the title set management information.

Figure 2:
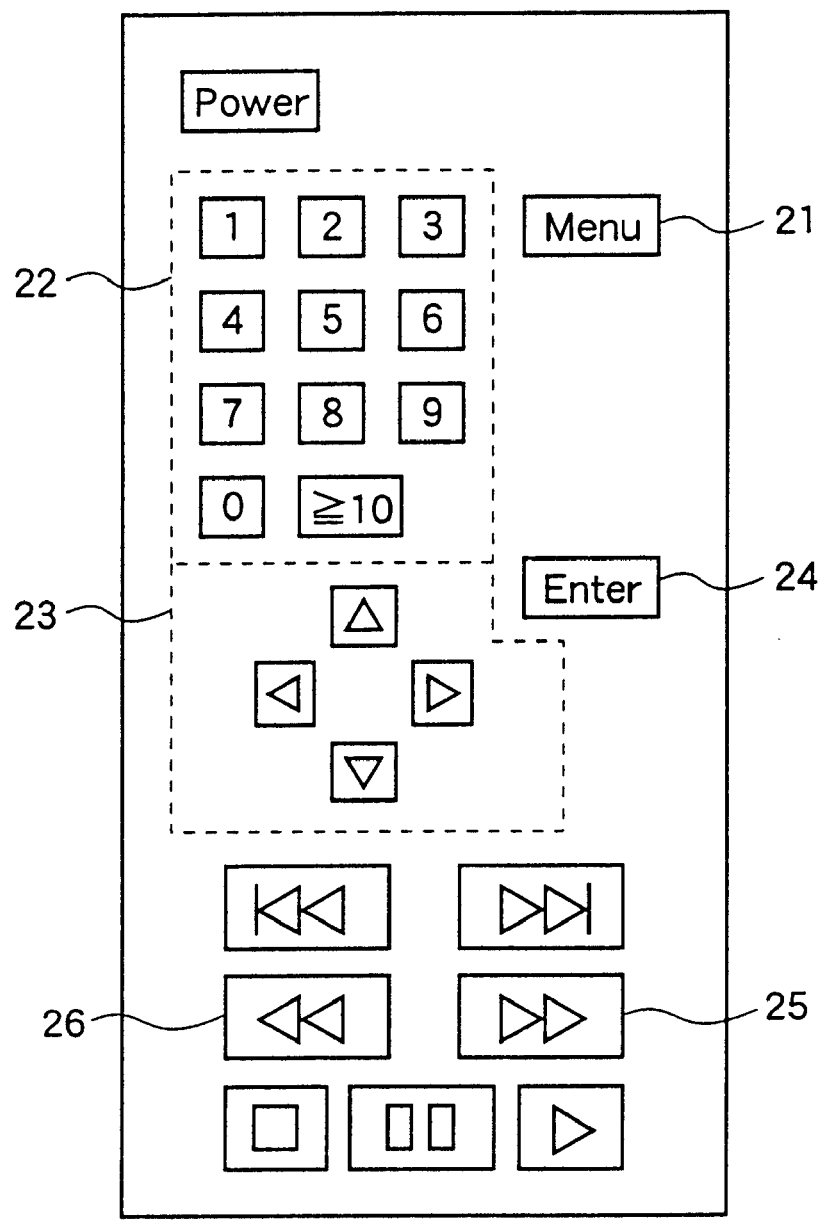
FIG. 2 is an external view illustrating an operation unit of a remote control transmitter.

A remote control 14 receives playback control instructions by the operation of users. FIG. 2 is an external view illustrating an operation unit of a remote control transmitter, which shows an example of key arrangement of the remote control 14. Hereinafter, a brief description is given of only keys. A "Menu" key 21 is one for calling the whole menu to be displayed during playback of a disc. "Ten" keys 22 and "direction" keys 23 are ones for selecting a menu item. A "Enter" key 24 is one for determining the selected item. The remote control 14 further includes a forward scan search key 25 and a reverse scan search key 26.

A remote control photo detector 15 receives infrared key signals which are transmitted by pressing the keys of the remote control 14, and transfers key data to the system control unit 17.

The buffer memory 16 temporarily retains the data which are input from the signal processing unit 4 via the system control unit 17.

The system control unit 17 receives the signals of the remote control photo detector 15, and controls the mechanism control unit 3, the signal processing unit 4, the buffer memory 16, the still image data storage unit 11, the AV decoder unit 5, the disc management information storage unit 12, and the title set management information storage unit 13. Though not shown but the unit 17 comprises a program memory which contains a program for realizing functions as the system control unit, a processor which implements the program, a general register and a timer, and the unit 17 controls the whole optical disc playback apparatus. To be specific, the unit 17 stores the data transferred from the signal processing unit 4 in the buffer memory 16, reads the data from the buffer memory 16, and performs control according to types of the read data. That is, when the read data are disc management information, the control is performed on the basis of the contents of these data. When the read data are title set management information including the audio/video sequence information, object position information, object playback information and the like, the control is performed on the basis of the contents of these data. When the read data are audio/video data, the audio/video data are transferred from the buffer memory 16 to the AV decoder unit 5, and when the data are still picture data of DVD-Audio standard discs, the data are stored in the still picture data storage unit 11. In addition, the system control unit 17 calculates a track on the disc corresponding to a logical block which is to be read next, indicates the position of the track, and instructs the mechanism control unit 3 to perform block reading control. Further, the unit 17 receives the signals from the remote control photo detector 15, converts the signals into data codes corresponding to pressed keys, and performs the playback control according to the keys.

Figure 5:
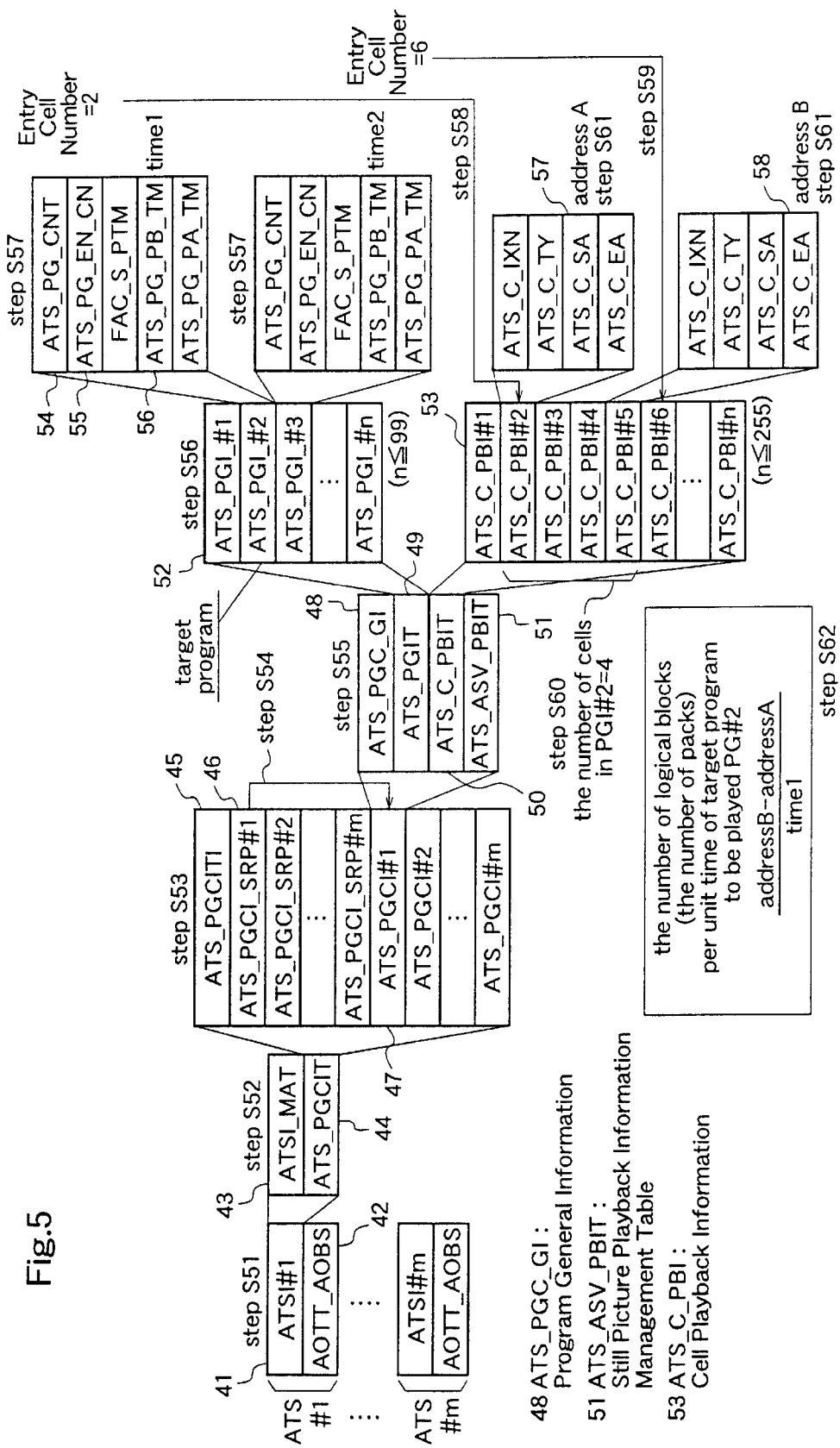
FIG. 5 is a diagram illustrating a file structure of title set management information of a DVD-Audio standard disc.
Figure 7:
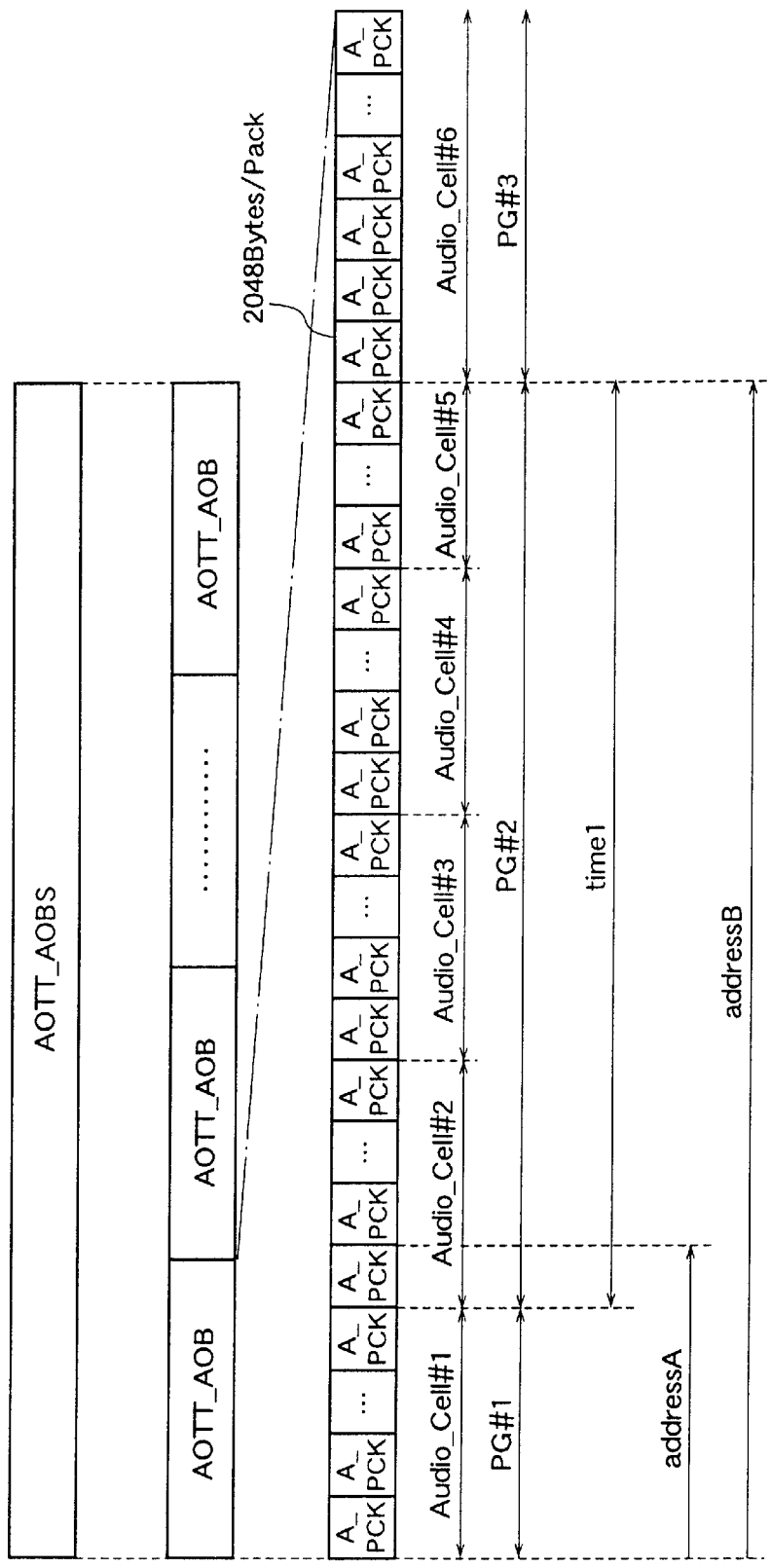
FIG. 7 is a diagram illustrating an object data structure of the DVD-Audio standard disc.

FIG. 7 shows a structure of object data in the DVD-Audio standard disc. As shown by a diagram of FIG. 5 illustrating a file structure of the title set management information of DVD-Audio standard disc, one ATS is constituted by ATS Information ATSI and an entity (object) of ATS AOTT#AOBS. As shown in FIG. 7, this AOTT#AOBS comprises plural AOTT#AOB, and the AOTT#AOB comprises plural Audio Cells. The Audio Cell comprises plural audio packs (A#PCK). As shown by a diagram of FIG. 8 illustrating a data structure of the pack, one A#PCK are 2048-byte data.

Here, the example of FIG. 5 will be explained by FIG. 7. Assume that PG#1 comprises only one Audio Cell, i.e., Audio Cell#1. Assume that PG#2 comprises four Audio Cells, i.e., Audio Cell#2 to Audio Cell#5. The Cell Start Address of PG#2 is address A and this is given by the relative logical block number (the number of packs) from the head of the AOTT#AOBS. On the other hand, the Cell End Address of PG#2 is address B and this is similarly given by the relative logical block number (the number of packs) from the head of AOTT#AOBS. Program Playback Time Information ATS#PG#PB#TM indicating the playback time of PG#2 is shown in FIG. 7 as time1.

Figure 8:
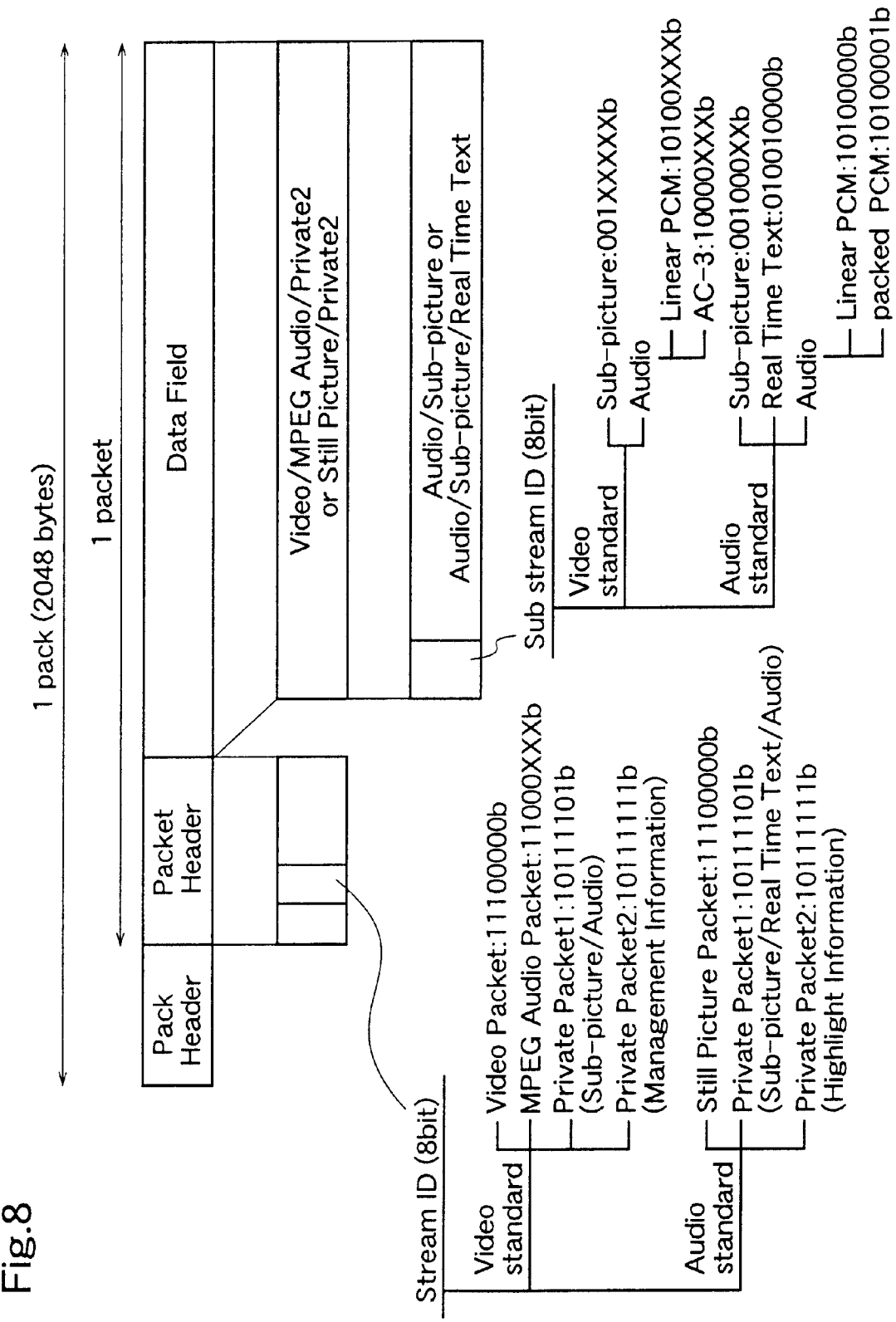
FIG. 8 is a diagram illustrating a data structure of a pack.
Figure 9:
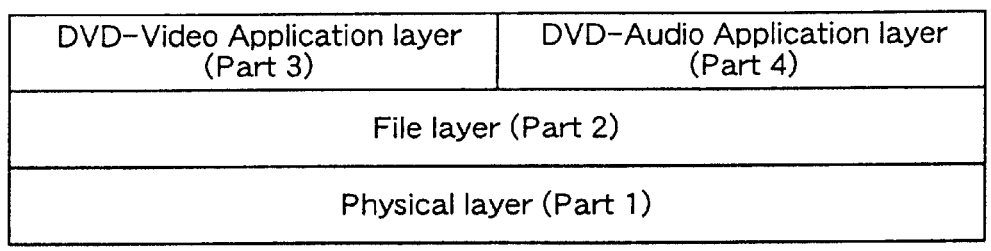
FIGS. 9(a) and 9(b) are diagrams showing the relationship on standards between DVD-Video standard and DVD-Audio standard.
Figure 9:
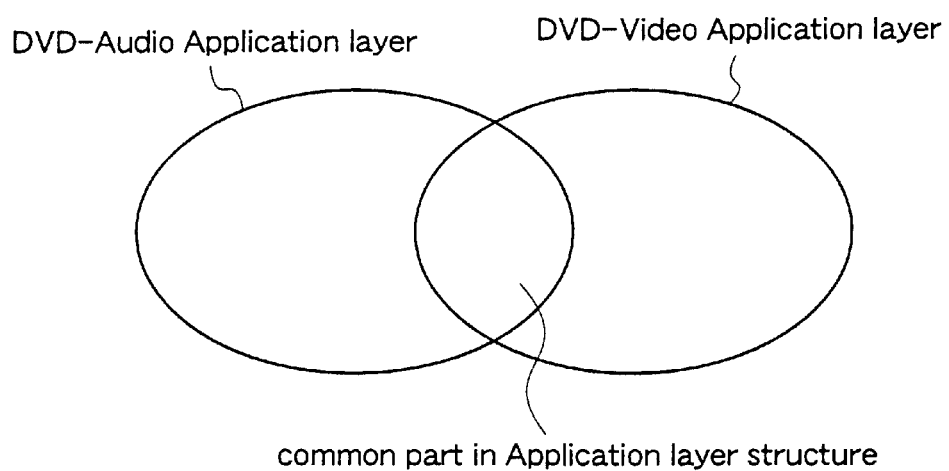
Figure 10:
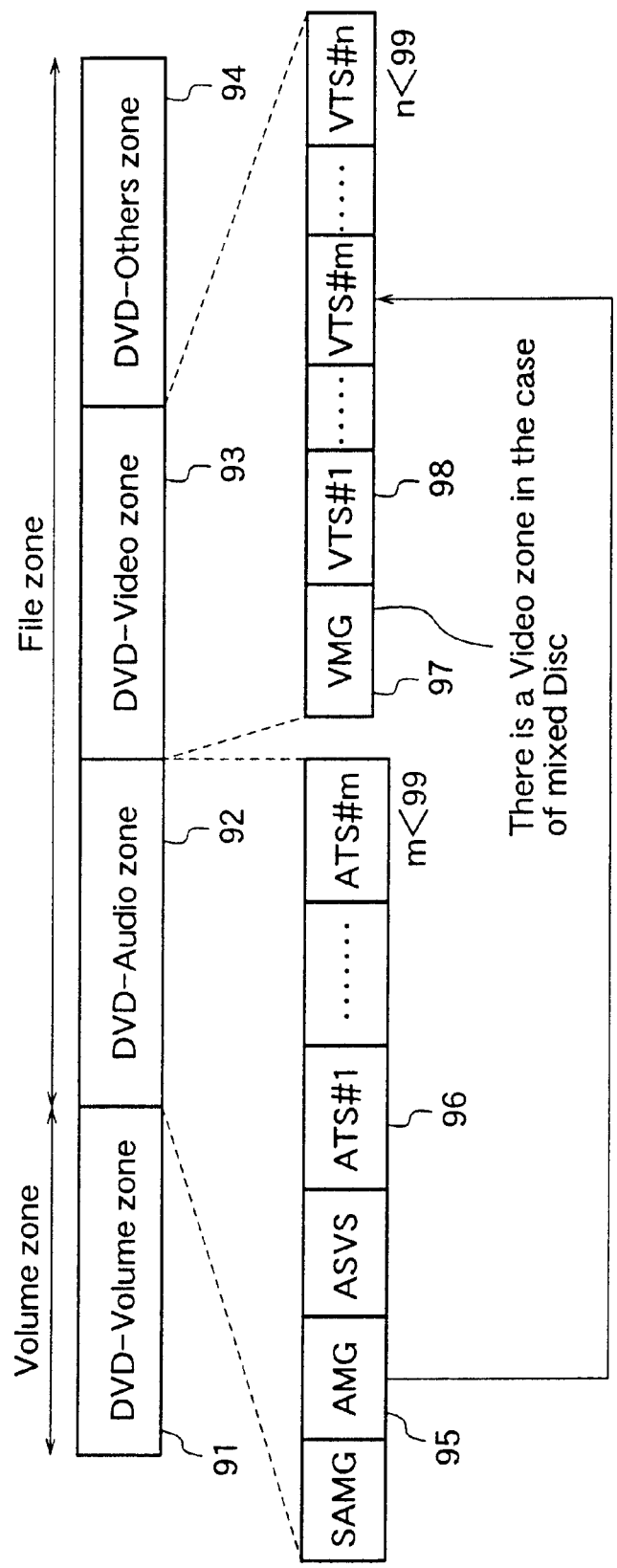
FIG. 10 is a diagram illustrating a file data structure of the DVD-Audio standard disc having both of the Audio zone and the Video zone.
Figure 11:
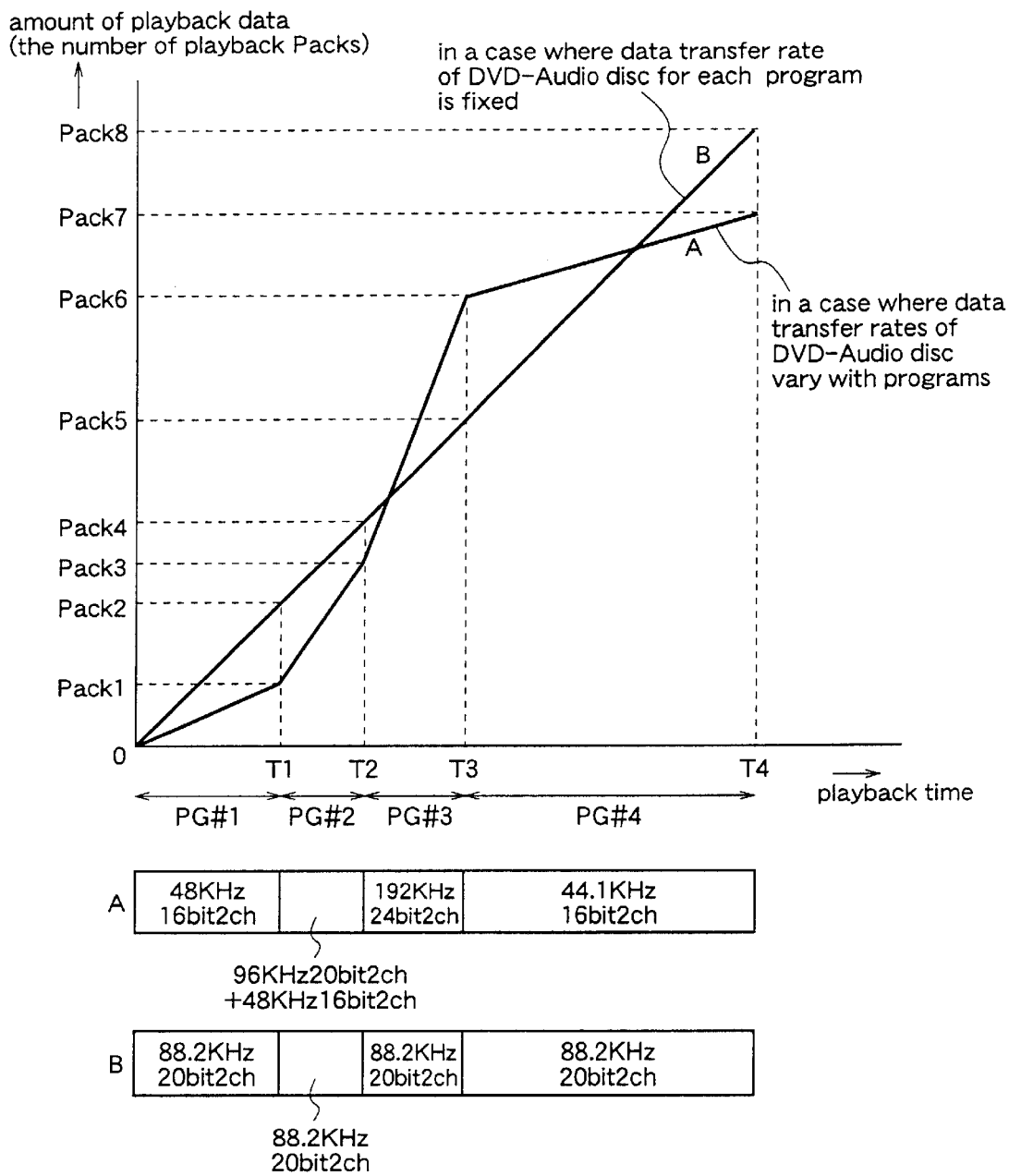
FIG. 11 is a diagram showing the relationship between the time and the amount of playback data for each playback program unit of the DVD-Audio standard disc.

FIG. 8 shows a structure of data of this pack. As shown in the figure, one pack comprises 2048 bytes and it includes a pack header at the head, followed by a packet header. This packet header includes an 8-bit stream ID indicating the type of the standard of data. In the case of audio data of DVD-Audio standard, the stream ID=10111101. The remaining data are a data field. The data field includes an 8-bit substream ID indicating the type of audio data, at the head. In the case of linear PCM audio data, the substream ID=10100000.

Figure 3:
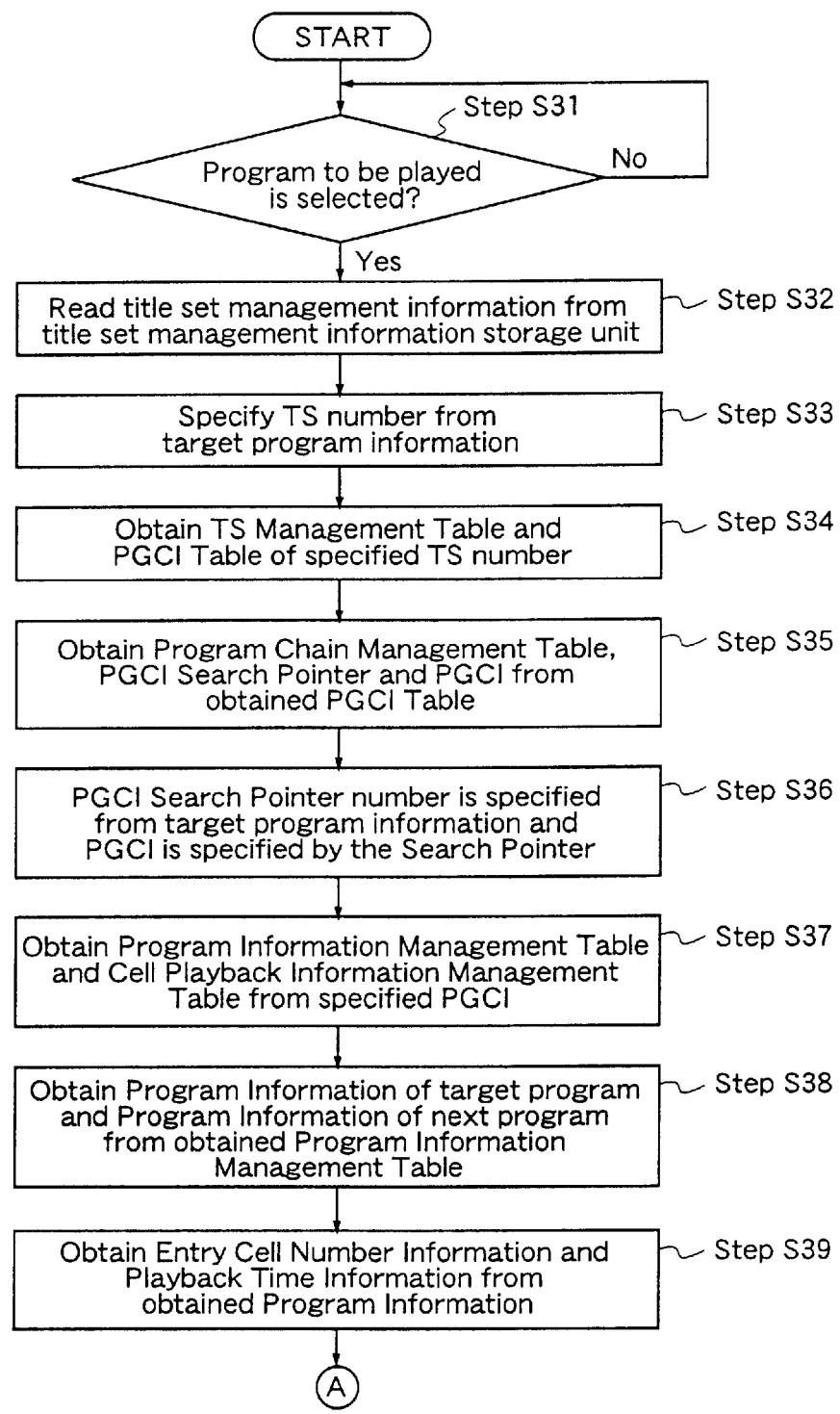
FIG. 3 is a flowchart showing processes for calculating an address amount of relative motion of an optical pickup for each scan search operation of a system control unit.
Figure 4:
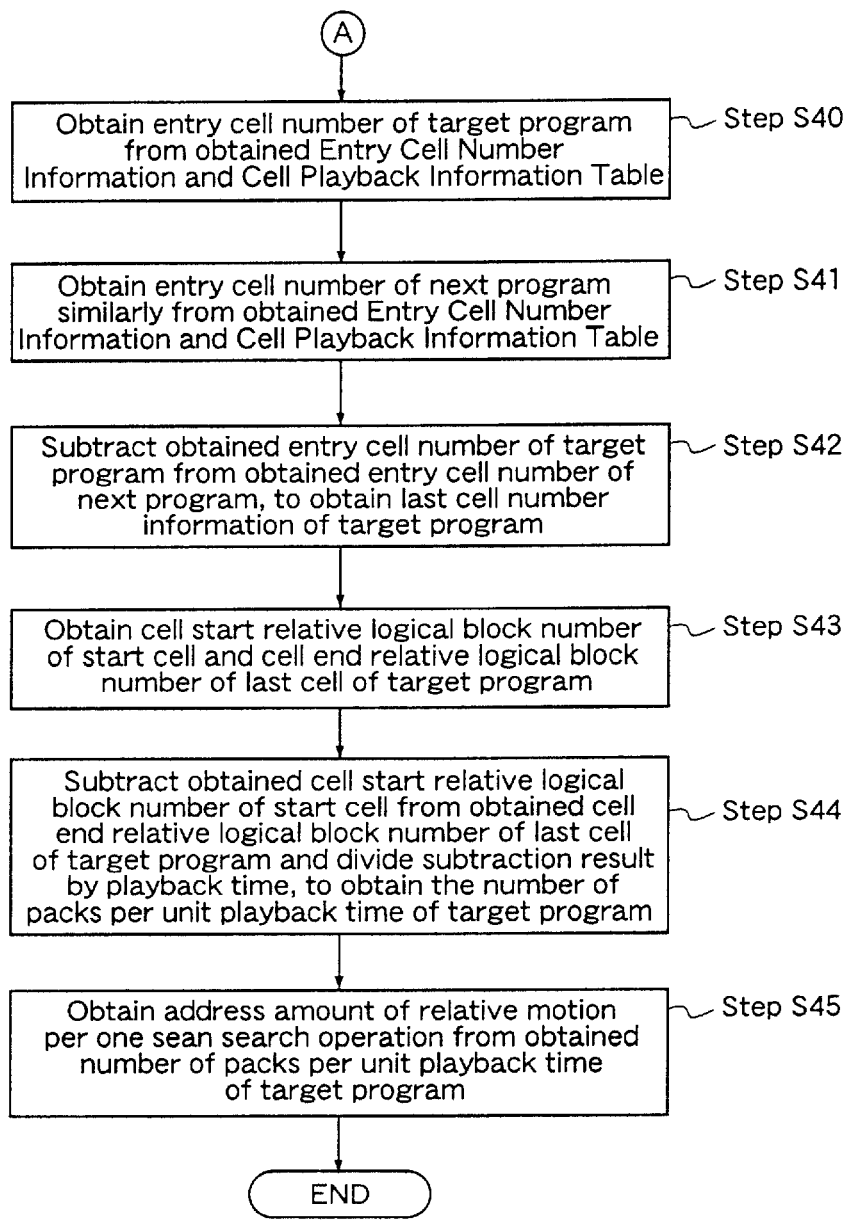
FIG. 4 is a flowchart showing processes for calculating an address amount of relative motion of the optical pickup for each scan search operation of the system control unit.

Hereinafter, the operation of the optical disc playback apparatus having the above-described structure will be described. FIGS. 3 and 4 are flowcharts showing processes of calculating an address amount of relative motion of the optical pickup per one scan search operation of the system control unit 17. FIG. 5 is the diagram illustrating the file structure of the title set management information stored in the title set management information storage unit 13 of the DVD-Audio standard disc.

Initially, when a program as an entity to be played (in this case PG#2, for example) is selected (step S31), the system control unit 17 reads the title set management information from the title set management information storage unit 13 (step S32). This program to be played PG#2 is specified to be in ATS#1, for example, among plural ATSs, i.e., ATS#1 to ATS#m, on the basis of the disc management information which is in a different area on the disc from the ATS Information and stored in the disc management information storage unit 12 (steps S33 and S51). The ATS comprises the ATS Information ATSI 41 and the ATS as the entity of the playback audio data AOTT#AOBS 42. An ATS Management Table ATSI#MAT 43 and a PGCI Table ATS#PGCIT 44 are obtained from the ATS Information ATSI 41 of the Audio Title Set ATS#L which is specified in the above-described manner (steps S34 and S52).

The start address of the PGCI Table ATS#PGCIT 44 on the memory and the end address of the ATS Information ATSI 41 on the memory are described in the ATS Management Table ATSI#MAT 43. Therefore, the memory address of the PGCI Table ATS#PGCIT 44 is known. An ATS Program Chain Management Table ATS#PGCITI 45, a PGCI Search Pointer ATS#PGCI#SRP 46 and PGCI ATS#PGCI 47 are obtained from the PGCI Table ATS#PGCIT 44 whose memory address is known (steps S35 and S53). In the Program Chain Management Table ATS#PGCITI 45, the number of PGCI Search Pointers and the end address of the PGCI Table ATS#PGCIT 44 on the memory are described.

It is specified that the target program to be played PG#2 is included in the PGCI ATS#PGCI#1 (47) having the memory address indicated by the PGCI Search Pointer ATS#PGCI#SRP#1 (46) (steps S36 and S54). A Program Information Management Table ATS#PGCIT 49 including the object playback information, and a Cell Playback Information Management Table ATS#C#PBIT 50 including the object position information are obtained from this specified PGCIATS#PGCI#1 (47) (steps S37 and S55). Program Information ATS#PGI#2 (52) of the target program to be played PG#2 and following Program Information ATS#PGI#3 (52) are obtained from the obtained Program Information Management Table ATS#PGIT 49. The obtained Program Information ATS#PGI 52 includes various types of object playback information (steps S38 and S56).

The object playback information which is obtained thus includes a Program Content ATS#PG#CNT 54 indicating Audio Spec Information, a Program Entry Cell Number ATS#PG#EN#CN 55 indicating the entry cell position of the program, and Program Playback Time Information ATS#PG#PB#TM 56 indicating the playback time of the program. In the object playback information, the Program Entry Cell Number ATS#PG#EN#CN 55 and the Program Playback Time Information ATS#PG#PB#TM 56 are obtained for each of the PG#2 and PG#3 (steps S39 and S57). Assume that it is known from the Program Entry Cell Number ATS#PG#EN#CN 55 that the entry cell number of the Cell Playback Information Management Table ATS#C#PBIT 50 including the object head position information of PG#2 is 2, for example (steps S40 and S58).

Similarly, assume that it is known from the Program Entry Cell Number ATS#PG#EN#CN 55 of the next program PG#3 that the entry cell number of the Cell Playback Information Management Table ATS#C#PBIT 50 including object head position information of PG#3 is 6, for example (steps S41 and S59). When the entry cell number of PG#2 is subtracted from the entry cell number of PG#3, it is known that the number of cells=4. Accordingly, it is known that the cell numbers of PG#2 are from ATS#C#PBI#2 to ATS#C#PBI#5 and the number of cells is four (steps S42 and S60).

The start address of the target program to be played PG#2 is obtained as the Cell Start Address ATS#C#SA 57 of ATS#C#PBI#2, i.e., addressA. On the other hand, the end address of the target program to be played PG#2 is obtained as the Cell End Address ATS#C#EA 58 of ATS#C#PBI#5, i.e., addressB. The ATS#C#SA 57 and ATS#C#EA 58 are the relative logical block numbers (numbers of packs) from the head of AOTT#AOBS (steps S43 and S61).

Then, the Cell Start Address "addressA" of PG#2 is subtracted from the Cell End Address "addressB" and the result is divided by the Program Playback Time Information ATS#PG#PB#TM 56=time1, which is required for playback of the target program to be played PG#2. Accordingly, the number of packs of playback data per unit playback time of the target program to be played PG#2 is obtained (steps S44 and S62).

The amount of relative motion by the jumping per one scan search operation is proportional to the obtained number of packs of playback data per unit playback time. To be specific, when the obtained number is larger, the amount of the relative motion by the jumping per one scan search operation is set to be larger, and when the number is smaller, the amount of the relative motion by the jumping per one scan search operation is set to be smaller (step S45).

Figure 6:
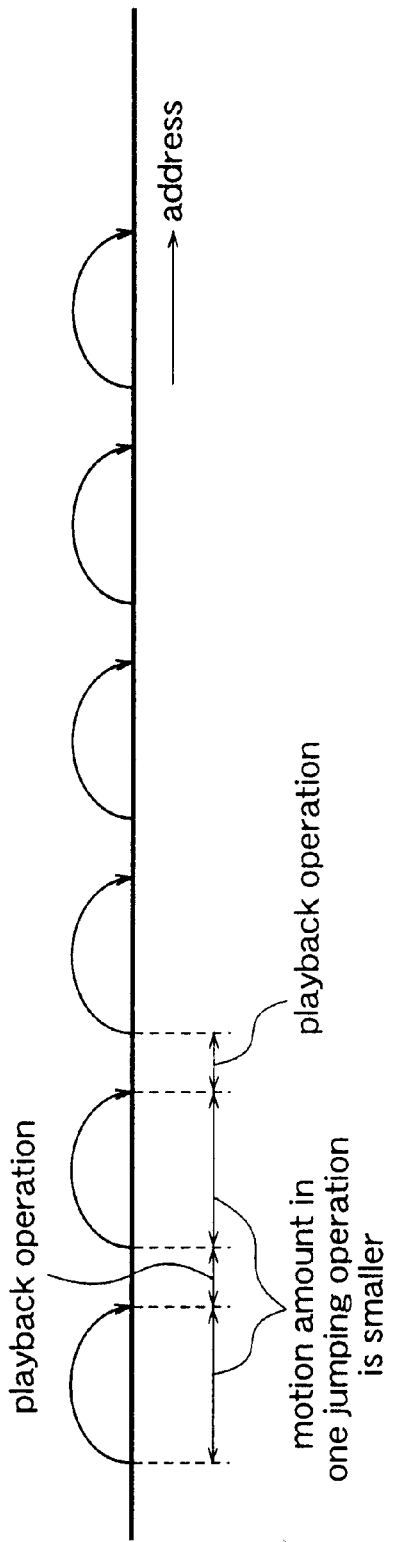
FIGS. 6(a) and 6(b) are diagrams for explaining the scan search operation.
Figure 6:
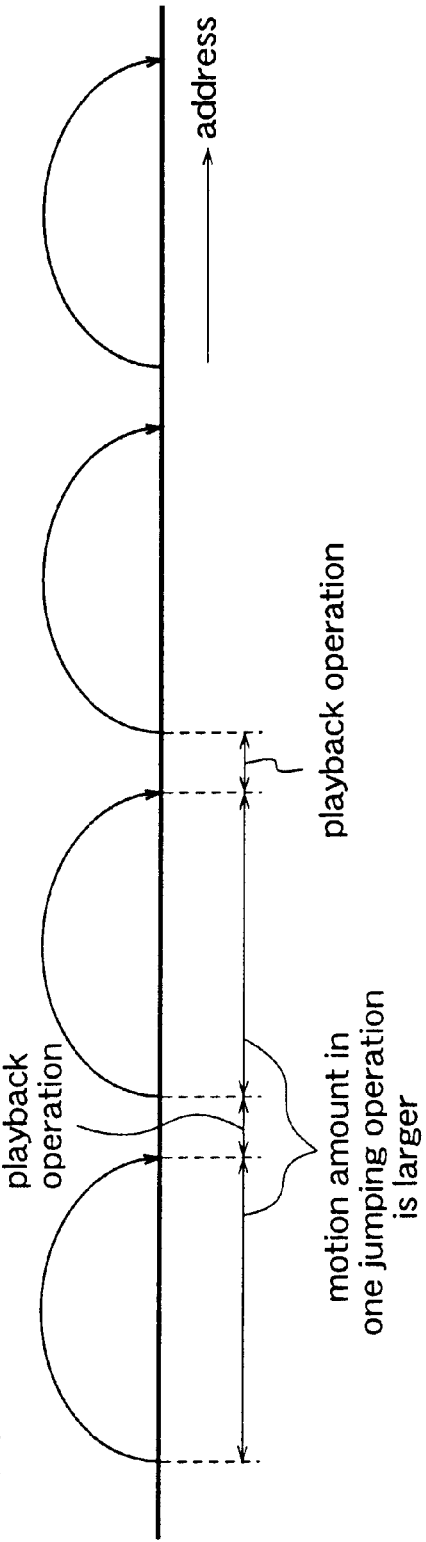

FIGS. 6(*a*) and 6(*b*) are diagrams for explaining the scan search operation according to the relationship between the number of packs of playback data per unit playback time and the amount of relative motion by the jumping per one scan search operation. The scan search operation is an operation of repeating the jumping operation and the playback operation to perform partial playback. When the number of logical blocks (the number of packs) per unit time is smaller as shown in FIG. 6(*a*), the amount of motion for one jumping operation is smaller. On the other hand, when the number of logical blocks (the number of packs) per unit time is larger as shown in FIG. 6(*b*), the amount of motion for one jumping operation is larger.

In this embodiment, the number of target programs to be played, which are subjected to the scan search is one. However, when the scan search is performed for plural programs to be played, the similar calculation is performed for each of the programs. When the programs have different playback data transfer bit rates, the amount of one jumping is adapted to each of the programs and thereafter the scan search is performed.

As described above, according to this embodiment of the present invention, the address amount of relative motion of the optical pickup per one scan search operation is decided on the basis of the object position information and the playback time of each program included in the object playback information, both of which information is stored in the title set management information storage unit 13 (title set management information storage means), and the amount of playback data obtained from the initial position and last position of each program. Therefore, the optical disc playback apparatus can realize the scan search operation having the scan search time which is proportional to the playback time, even when the apparatus plays back an arbitrary program among the playback unit programs having the different playback data transfer bit rates, in a case where the scan search operation for all audio data recorded on the optical disc is performed.

The aforementioned embodiment is described as an example and therefore this embodiment can be implemented changing details to realize the scopes of claims of the present invention. Any apparatus can be employed as long as this apparatus can decide the address amount of relative motion of the optical pickup per one scan search operation from the program management information stored in the disc, by the arithmetic using the playback data amount obtained from the start position and end position of the program having a prescribed transfer rate, and the playback time.

This arithmetic can be performed by a microprocessor. However, it is also possible that a comparison table which is previously obtained by combining last position data and initial position data of the program and the playback time is provided, and the search is performed using this comparison table.

What is claimed is:

1. An apparatus for playing back an optical disc comprising:

an audio/video data storage area containing plural pieces of audio or video data which have playback data transfer bit rates varying with playback unit programs; and a title set management information storage area and a disc management information storage area as program management information storage areas containing program management information including title set management information and disc management information for playing back the plural pieces of audio or video data in the audio/video data storage area, respectively, in a scan search for playing back necessary data in the audio or video data, said optical disc playback apparatus obtaining last position data, initial position data, and a playback time of a program having the necessary data from the program management information, and deciding an address amount of relative motion per one scan search operation for the program by arithmetic using the last position data, the initial position data, and the playback time.

2. The optical disc playback apparatus of claim 1 wherein the program management information is read and stored in storage means at a time when the optical disc is mounted.

3. The optical disc playback apparatus of claim 1 wherein a value is obtained by the arithmetic, by subtracting the initial position data of the program from the last position data, and then dividing the subtraction result by the playback time.

4. The optical disc playback apparatus of claim 1 wherein the arithmetic is performed by providing a comparison table having values of address amounts of relative motion for combinations of the last position data, the initial position data and the playback time of the program, and searching a value from the comparison table.

5. An apparatus for playing back an optical disc comprising:

an audio/video data storage area which contains plural pieces of audio or video data;

at least one title set management information storage area which contains audio or video sequence information constituting an audio or video sequence and indicating a predetermined playback order of the audio or video data, object position information indicating a position of the audio or video data on the optical disc, and object playback information of the audio or video data; and at least one disc management information storage area which contains title set position information indicating a position of the title set management information storage area on the optical disc, and disc management information for managing the whole disc, said optical disc playback apparatus comprising:

reading means for reading the audio or video data, the audio or video sequence information, the object position information, the object playback information, the title set position information, and the disc management information from the optical disc, to play back the information;

control means for controlling the reading means;

disc management information storage means containing the disc management information which is obtained from the at least one disc management information storage area; and title set management information storage means containing the title set management information which is obtained from the title set management information storage area, wherein said control means perform control to read the audio or video sequence information, the object position information, the object playback information, the title set position information, and the disc management information from the optical disc, thereby to store the information in the title set management information storage means or the disc management information storage means;

control the reading means on the basis of respective contents of the disc management information, the audio or video sequence information, the object position information, the object playback information, and the title set position information;

when performing a scan search operation, previously calculate an amount of playback data per unit playback time on the basis of the object position information and a playback time of each program included in the object playback information, and an amount of playback data which is obtained from a last position and an initial position of each program; and decide an address amount of relative motion per one scan search operation on the basis of the calculation result.

* * * * *